United States Patent Office 2,956,079
Patented Oct. 11, 1960

2,956,079

ALLYLSULFONYLALKYL ESTERS

Edward M. La Combe, Charleston, and Byron Stewart, South Charleston, W. Va., assignors to Union Carbide Corporation, a corporation of New York No Drawing. Filed Oct. 9, 1958, Ser. No. 766,192

2 Claims. (Cl. 260—488)

This invention relates to a new class of sulfones. More particularly it is concerned with novel allylsulfonylalkyl esters.

This invention is a continuation-in-part of our copending patent application "Olefinic Compounds and Processes Therefor," Serial No. 728,794, filed April 16, 1958. In the parent application there is disclosed a novel process for the production of olefinically unsaturated compounds in high purity and in good yield by the pyrolysis of allyl sulfonyl compounds. This invention is concerned solely with novel allylsulfonylalkyl esters which are suitable as intermediates therein. By the processes herein disclosed it is possible to produce novel allylsulfonylalkyl esters which can be used to produce alpha-olefins which are not readily obtained by any other process known to the art.

The allylsulfonylalkyl esters of this invention can be represented by the general formula:

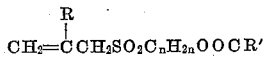

wherein R can represent a halogen atom such as fluorine, chlorine, bromine or iodine, or a cyano radical; R' can represent a lower alkyl radical containing up to about 5 carbon atoms such as methyl, ethyl, propyl, isopropyl, butyl, sec.-butyl, tert.-butyl, pentyl, neopentyl, and the like; and ($n$) is an integer having a value of from 1 to about 12, and preferably from 2 to about 8.

The allylsulfonylalkyl esters of this invention can be produced by the oxidation of an allylthioalkanol with, for example, peracetic acid to form the allylsulfonylalkanol which is then esterified, or an allylthioalkyl ester is oxidized directly to produce the allylsulfonylalkyl ester.

The oxidation of the allylthioalkanol or allylthioalkyl ester to the sulfonyl compound can be carried out at temperatures of from about 0° C. to about the reflux temperature of the reaction mixture; preferably, however, a temperature of from about 20° C. to about 40° C. is employed. The reaction can be carried out in the absence of diluent, or preferably in the presence of an inert organic diluent such as, for example, ethyl acetate, ethylbenzene, toluene, acetone, acetic acid, and the like.

The preferred oxidizer is a solution of peracetic acid in an inert organic solvent. However, other oxidizing agents can be used, for example, sodium or potassium permanganate, hydrogen peroxide, chromic anhydride and the like.

Among the allylsulfonylalkyl esters which can be produced by the processes of this invention there may be mentioned 2-(2-chloroallylsulfonyl)-ethyl acetate, 2-(2-cyanoallylsulfonyl)ethyl acetate, 4-(2-chloroallylsulfonyl)-butyl propionate, 4-(2-cyanoallylsulfonyl)-2-ethylbutyl acetate, 2-(2-chloroallylsulfonyl)propyl acetate, 2-(2-cyanoallylsulfonyl)propyl acetate, 4-(2-chloroallylsulfonyl)-butyl butyrate, and the like.

The allylsulfonylalkyl esters of this invention are valuable as intermediates for the production of alpha-olefinic compounds. In addition, the olefins can be used as starting materials for the production of epoxide compounds useful as intermediates for making epoxy resins.

The following examples further serve to illustrate this invention. Parts are by weight unless otherwise specified.

Example 1

To a two-liter, four-necked flask equipped with a stirrer, thermometer, condenser, and dropping funnel, there was added 400 grams of 2-(2-chloroallylthio)ethanol. Over a 2.5 hours' period there was slowly added 1,870 grams of a 21.3% by weight solution of peracetic acid in ethyl acetate. The temperature of the reaction was maintained between 20° to 30° C. and stirring was continued at this temperature for an additional two hours. The acetic acid formed from the peracetic acid and the ethyl acetate solvent were distilled at reduced pressure while keeping the kettle temperature below 70° C. Then 306 grams of acetic anhydride and two grams of concentrated hydrochloric acid were added, and the mixture was stirred at 140° C. for two hours. The 2-(2-chloroallylsulfonyl)-ethyl acetate weighing 550 grams was recovered after distilling acetic acid and excess acetic anhydride at reduced pressures at a temperature up to about 160° C.

The 2-(2-chloroallylsulfonyl)ethyl acetate was converted to 4-chloro-4-pentenyl acetate by heating at 175° to 190° C. and 100 mm. pressure. The identity of the 4-chloro-4-pentenyl acetate was established by elemental analysis and infrared spectroscopy.

Example 2

To the equipment described in Example 1 there was charged 357 grams of acetic anhydride containing 1 gram of concentrated sulfuric acid. At 140° C. 420 grams of 2-(2-chloroallylthio)ethanol was added while the mixture was stirred. The sulfuric acid was neutralized with two grams of sodium acetate, and the excess acetic anhydride was distilled at reduced pressure. Then 415 grams of 2-(2-chloroallylthio)ethyl acetate was recovered by distillation at 105° to 108° C. and 5 mm. pressure; $n$ 30/D was 1.4932. The 2-(2-chloroallylthio)ethyl acetate was oxidized to 2-(2-chloroallylsulfonyl)ethyl acetate by the addition thereto at 20° to 30° C. of 1305 grams of a 25.6% by weight solution of peracetic acid in ethyl acetate. After stirring for a short while, the reaction mixture was allowed to stand overnight at room temperature. The ethyl acetate and acetic acid, and other low boiling products were distilled at reduced pressures at a kettle temperature below 70° C., leaving the 2-(2-chloroallylsulfonyl)ethyl acetate in the reaction flask. Pyrolysis as in Example 1 produced 4-chloro-4-pentenyl acetate.

What is claimed is:

1. An allylsulfonylalkyl ester as represented by the general formula:

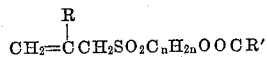

wherein R represents a member selected from the group consisting of a halogen atom and a cyano radical; R' represents a lower alkyl radical containing from 1 to about 5 carbon atoms; and ($n$) is an integer having a value of from 1 to about 12.

2.

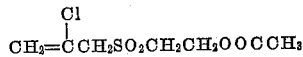

References Cited in the file of this patent

UNITED STATES PATENTS 2,812,267  Garner et al. _____ Nov. 5, 1957